UNITED STATES PATENT OFFICE.

LOTHAR STERNBERG, OF JERSEY CITY, NEW JERSEY, ASSIGNOR TO THE AMERICAN SUGAR REFINING COMPANY, OF NEW YORK, N. Y.

PROCESS OF OBTAINING AMMONIA FROM WASTE SUGAR LYES.

SPECIFICATION forming part of Letters Patent No. 557,166, dated March 31, 1896.

Application filed November 9, 1895. Serial No. 568,443. (No specimens.)

*To all whom it may concern:*

Be it known that I, LOTHAR STERNBERG, of Jersey City, New Jersey, have invented certain Improvements in the Process of Obtaining Ammonia from Waste Sugar Lyes, of which the following is a specification.

The process which forms the subject of the present improvement may be regarded as a further development of the process of obtaining ammonia and other salts from molasses, described in Letters Patent of the United States No. 486,647, dated November, 22, 1892.

The present invention embraces essentially the use of an aluminate, either an aluminate of alkali or an aluminate of alkaline earths, as the principal ingredient of the granular or powdered mass of material employed as the carrier for the waste lye which is to be treated for the manufacture of ammonia, the aluminate being employed not merely as a carrier, but also as a chemical reagent.

Incidentally the present invention embraces also a particular method of preparing a carrier containing as its important ingredient aluminate of potassium, which it is preferred to employ.

In the present process the waste lye is subjected to heat in the presence of an aluminate (preferably the aluminate of potassium) under such conditions that the ammonia and other gases immediately generated are drawn or forced through a body of incandescent material composed of a mixture of aluminate of potassium and alumina, whereby the nitrogenous gases thus generated are transformed into ammonia. At a later stage in the process the nitrogenous organic compounds contained in the residuum of the lye are by further subjection to heat also transformed into ammonia. The ammonia thus obtained is removed and fixed in any usual manner—as, for example, by causing it to come in contact with sulphuric acid in an ordinary condensing-tower.

In the preparation of the carrier which I prefer to employ I make use of aluminiferous bauxite. If the bauxite contains silica in any large amount, I add a sufficient quantity of lime to counteract any effects of the silica which are obnoxious to the formation of aluminate of potassium. I may use clay instead of bauxite, but in such case I add a proportionately larger amount of lime. The bauxite having been ground is mixed with powdered black ash or crude potash in the proportion of one and one-half parts of bauxite to one of crude potash. Sufficient water is added to the mixture to make it plastic, and it is then molded into blocks of any desired shape and dried at a temperature of about $212°$ Fahrenheit. When the blocks are hard at this temperature, they are broken or crushed into pieces of convenient shape, and the crushed product is heated to redness in a furnace or retort, of any known construction, after which it is removed from the retort and ground to a powder. This powder, consisting, essentially, of aluminate of potassium, aluminate of sodium and alumina, together with the impurities originally present in the bauxite and in the black ash or crude potash, constitutes the material with which the waste lye, having been previously concentrated to a density of $75°$ Brix, is first mixed in equal proportions. To one hundred parts of such concentrated lye and one hundred parts of the described powder I add thirty parts of bauxite.

The proportions of the waste lye and the bauxite are so regulated that the proportion of black ash, resulting from the glowing of the waste lye, to the bauxite is the same as in the preliminary step of preparing the aluminate of potassium—that is to say, one part of black ash to 1.5 part of bauxite. This proportion can of course be varied to some extent; but it is essential to so regulate it that the mixed mass during and after the drying will neither swell too much, nor bake together, nor crumble, nor melt. Thus I have found that if only one part of bauxite is used with one part of black ash, then the mixture is liable to melt. I have also found that if bauxite is present in larger proportion than one and one-half to one part of black ash, then in the heating process the bricks are liable to crumble.

It is likewise to be observed that while the proportion of waste lye introduced into the carrier can be varied within certain limits it is not desirable that there should be less than one hundred parts of the powder to one hundred parts of the lye, because, on the one hand, the drying of the mass would take too much time, and, on the other hand, a sufficiently hard product could not be easily obtained if a greater proportion of waste lye should be taken.

The mixing of the lye with its carrier may be effected in any of the well-known forms of mixers, preferably one which is provided with a heating apparatus in order to evaporate part of the water if the concentration of the lye is not high enough. It will in any case be useful to add a small quantity of sawdust to the mixture, in order to facilitate the drying operation.

The mixture, which at first is rather soft, is stirred until it becomes hard and stiff and is then pressed into blocks of any desired shape. These blocks are then dried at a temperature of about 212° Fahrenheit. When the blocks are found to be hard at the temperature of 212° Fahrenheit, they are broken in pieces of convenient shape and glowed—that is, heated to redness—in a retort and furnace of any known construction. I preferably employ for this purpose the constructions similar to those used for revivifying bone-black, which, having vertical retorts, facilitate the conduct of the process continuously. The gases which are produced during the glowing process, as well as any that may be introduced from the outside, as described in Letters Patent of the United States No. 523,819, issued to me July 31, 1894, are conducted in the same direction as the glowing mass and are removed from the bottom of the retort.

The final process of glowing is conducted as follows: The crushed bricks containing the waste lye are fed into the top of a retort, which is at first nearly filled with the mixture of aluminate of potassium and alumina, obtained from bauxite and black ash, as hereinbefore described. The resulting gases are conducted downward through the glowing body of material in the retort, and thereby the nitrogenous organic compounds, generated by the decomposition of the lye in the upper part of the retort, are transformed into ammonia. As the process goes on the incandescent mass will gradually be removed from the bottom of the retort, and the material afforded by the crushed bricks, which may be regarded as the solid carrier of the waste lye, will continue to be fed into the top of the retort. While the organic matters of the lye are transformed into gaseous compounds, the solid carrier of the lye when it reaches the lower part of the retort is perfectly calcined and has the same composition and will perform the same function as the glowed mass of bauxite and black ash originally introduced into the retort.

The calcined mass from the retort may be ground and used together with bauxite as a carrier for a new quantity of waste lye. The mass discharged from the bottom of the retort, not used as a carrier for the lye, is a salable product in itself, or it may be leached with water and the resulting insoluble residue may be used instead of bauxite for the purpose of being mixed with waste lye. The solution by being saturated with carbonic acid may be transformed into the alkaline carbonates and insoluble hydrate of aluminium. The resulting hydrate of aluminium is also a salable product, but may be used instead of bauxite for mixture with waste lye.

The solution of carbonates of potassium and sodium containing chlorid and sulfate of potassium (and possibly other salts) originally present in the waste lye may be treated by the well-known method of successive evaporation and crystallization to obtain these different products from it.

The mechanical advantages of the carrier which I have described and which result from the inclusion in it of an aluminate and alumina are the following: First, the bricks described when subjected to heat do not swell; secondly, they do not crumble and thereby clog the retort, and, thirdly, they do not melt.

The chemical advantage of my carrier results from the presence in it of an aluminate, the most effective one for my purposes being aluminate of potassium. This chemically influences the formation of ammonia from the nitrogenous compounds of the waste lye by a reaction similar to that of the hydrates of potassium, sodium, and lime. The reaction of the aluminates is at first not so energetic as that of the alkalies, but it remains persistent, while lime and the hydrates of an alkali soon lose their effectiveness by being saturated with the carbonic acid set free by the decomposition of the organic matters of the lye or perhaps introduced from the outside. Carbonic acid does not saturate an aluminate.

In consequence of the persistent effectiveness of the aluminates I am enabled to glow at a lower temperature than has heretofore been possible and to thus avoid the danger of losing ammonia by dissociation when the high temperatures are employed. I am therefore able to conduct the process with the use of less than the usual quantity of steam or non-oxidating gases. Moreover, in my process a moderate quantity of oxygen may be admitted without perceptible loss of ammonia.

Of course my process of transforming into ammonia the nitrogenous gases generated by the dry distillation of the waste lye, by conducting these gases through an incandescent mass containing essentially an aluminate of either potassium or sodium, or aluminates of both potassium and sodium, can be used to transform into ammonia any kinds of nitrogenous organic gases of any origin whatever—as, for instance, those resulting from the dry distillation of animal refuse—such as hair, wool, bones, skin, hides, blood, &c., or of mineral matters—such as peat, bog, and other bituminous substances. By conducting these gases through a heated retort filled with pieces of convenient shape of the material obtained, as described above, from bauxite and black ash, or crude soda or potash, the said gases are transformed into ammonia.

While I prefer to employ bauxite for the preparation of the aluminate, it is to be understood that any kind of alumina, oxid of aluminium, hydrate of aluminium, clay, or such salts of aluminium as will give aluminates if glowed with alkaline salts can be used for that purpose.

What is claimed as the invention is—

1. The herein-described process of obtaining ammonia from the waste lyes resulting from the extraction of sugar, or the manufacture of alcohol from molasses, which consists in subjecting such waste lyes to the heat of incandescence in the presence of an aluminate, preferably the aluminate of potassium, as herein set forth.

2. The herein-described method of treating the waste lyes remaining after the extraction of sugar or the manufacture of alcohol from molasses, preparatory to extracting ammonia therefrom which consists in concentrating such lyes to a density of, say, 75° Brix, then mixing such concentrated lyes with alumina and an aluminate in such proportions as will form a plastic mass, then forming such plastic mass into bricks of convenient size and drying the same as set forth.

3. The herein-described process of obtaining ammonia from waste lyes resulting from the extraction of sugar or the distilling of alcohol from molasses, which consists in first mixing the waste lye, after convenient concentration, with an aluminate, preferably the aluminate of potassium and with alumina, forming the resultant mixture into bricks and drying the same, then heating them to redness, and thereby forming an incandescent contact-body and in conducting over said incandescent contact-body the nitrogenous organic vapors generated by the act of heating said contact-body and thereby transforming said vapors into ammonia.

4. The herein-described process of transforming gaseous nitrogenous organic compounds into ammonia, which consists in conducting such gases over a glowing contact-body, composed essentially of an aluminate, as, for example, the aluminate of potassium.

LOTHAR STERNBERG.

Witnesses:
A. M. JONES,
E. GATTERER.